TIME-LIMITED SWITCHING FOR WORD-ORGANIZED MEMORY

Filed Sept. 22, 1961 2 Sheets-Sheet 1

INVENTOR
SIGBJORN A. BREKNE
BY Herbert [signature]
ATTORNEY

Sept. 20, 1966 S. A. BREKNE 3,274,570

TIME-LIMITED SWITCHING FOR WORD-ORGANIZED MEMORY

Filed Sept. 22, 1961 2 Sheets-Sheet 2

INVENTOR
SIGBJORN A. BREKNE
BY
ATTORNEY

United States Patent Office 3,274,570
Patented Sept. 20, 1966

3,274,570
TIME-LIMITED SWITCHING FOR WORD-ORGANIZED MEMORY

Sigbjorn A. Brekne, St. Paul, Minn., assignor to Sperry Rand Corporation, New York, N.Y., a corporation of Delaware Filed Sept. 22, 1961, Ser. No. 139,947
13 Claims. (Cl. 340—174)

This invention relates generally to magnetic memory systems and more specifically to a system utilizing transformer coupling of a symmetrical read-write signal to the magnetic memory elements. The magnetic memory system disclosed by this application is of that class that utilizes a bipolar read-write signal and that provides destructive read-out of the stored data during the read cycle with regeneration, or a writing back in, during the write cycle of the read-out data.

The value of the utilization of small cores of magnetic material as memory elements in electronic data processing systems is well-known. This value is based upon the bistable characteristics of magnetic cores which include the ability to retain or remember magnetic conditions which may be utilized to indicate a binary "1" or "0." As the use of magnetic cores in memory systems increases, a primary means of improving the computational speed of the associated computer is to devise means of decreasing the time required to switch the core from one magnetic state to the other. Also, as the cost of the memory system makes up a substantial portion of the total cost of the associated electronic data processing system new methods and techniques of achieving reliable and economical interconnections to the memory system matrix array are continually being sought. This invention provides a novel technique whereby a symmetrical read-write signal is coupled to the memory system matrix array through the use of conventional pulse transformers and whereby the memory system's read and write cycle durations are decreased through the use of the concept of time-limited switching.

Ordinary magnetic cores and circuits utilized in magnetic memory systems are now so well-known that the need no special description herein. However, for purposes of the present invention, it should be understood that such magnetic cores are capable of being magnetized to saturation in either of two directions. The term "saturation" as used in this specification shall describe that condition of the core wherein increase of the drive field amplitude or duration will cause no appreciable increase in the core flux density. Furthermore, these cores are formed of magnetic material which is selected to have at least two stable remanent magnetic states which assures that after the core has been saturated in either direction and the drive field has been removed, a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite direction of saturation, i.e., negative saturation denoting a binary "0." One or more output coils are usually provided to sense when the core switches from one state of saturation to the other. Switching of the core can be achieved by passing a drive signal of sufficient amplitude through the input windings in a manner so as to set up a magnetic field in the area of the magnetic core in the sense opposite to the preexisting flux direction, thereby driving the core to saturation in the opposite direction of polarity, i.e., of positive to negative saturation. When the core switches, the resulting magnetic field variation induces a signal in the other windings on the core such as, for example, the above mentioned output or sense winding. The amplitude or polarity of the output signal identifies the stored state as having been a "1" or a "0." The core magnetic material may be selected from various magnetic materials such as those known as Mumetal, Permally or the ferro-magnetic ferrites such as that known as Ferramic.

The copending application of Korkowski, V. J., Ser. No. 853,067, filed November 16, 1959, and assigned to the assignee of this application, discloses a novel magnetic memory element employing "time-limited" switching as compared to conventional "amplitude-limited" switching. This copending application teaches that in conventional magnetic memory element operation the hysteresis loop followed by a core in cycling between its "1" and "0" states is determined by the amplitude of the drive signal, i.e., the amplitude of the magnetomotive force applied to the core. This is due to the fact that the duration of the drive signal is made sufficiently long to cause the flux density of each core in the memory system matrix array to build up to the maximum possivle value attainable with the particular magnetomotive force applied, i.e., the magnetomotive force is applied for a sufficient time duration to allow the core flux density to reach a steady-state condition with regard to time. The core flux density thus varies only with the amplitude of the applied field rather than with the duration and amplitude of the applied field. In the conventional prior art operation of magnetic memory systems in the amplitude-limited switching mode, it is a practical necessity that the duration of the read drive field be at least one and one-half times as long as the nominal switching time, i.e., the time required to cause the magnetic state of the core to move from one remanent magnetic state to the other, of the cores employed. This is due to the fact that some of the cores in the memory system have longer switching times than other cores, and it is necessary for the proper operation of a magnetic memory system that all the cores therein reach the same state or degree of magnetization on read-out of the stored data. Also, where the final core flux density level is limited solely by the amplitude of the applied drive field, it is necessary that the cores making up the memory system matrix array be carefully graded such that the output signal from each core is substantially the same when the state of each core is reversed, or switched.

The above referenced copending application of Korkowski, V. J., teaches a novel method of operating a magnetic memory element wherein the level of flux density reached by the application of a drive field of a predetermined amplitude is limited by the duration of the drive field. A typical cycle of operation according to this "time-limited" operation consists of applying a first drive field of a predetermined amplitude and duration to a selected magnetic memory element, or core, for a duration sufficient to place the core in one of its normal steady-state conditions. A second drive field having a predetermined amplitude and a polarity opposite to that of the first field is applied to the core for a duration insufficient to allow the core flux density to reach a steady-state condition. The term "steady-state" when used in this specification shall mean that condition of the core wherein with a constant drive field amplitude, increase of the drive field duration shall cause no appreciable increase in core flux density. This second field places the core in a second stable state, the flux density of which is considerably less than the flux density of the second stable state normally used for conventional or amplitude-limited operation. The second stable state is fixed in position by the asymmetry of the two drive field durations and by the procedure of preceding each second drive field application with a first drive field application.

In conventional bit-organized and word-organized memory systems wherein cores possessing substantially rectangular hysteresis characteristics are utilized for the storing media, for reasons stated hereinbefore, a read signal larger than the write signal is utilized to ensure switching of all the cores in the memory array. As mentioned in the preceding discussion, the switching technique employed in the illustrated embodiment of the above mentioned copending application of Korkowski, V. J., utilizes an asymmetrical read-write signal to achieve the larger read signal for magnetic memory element operation.

Due to the more simple and less expensive arrangements of transformer-coupling as compared to transistor-diode coupling of drive signals to magnetic memory systems, transformer-coupling techniques are very desirable. However, in a transformer-coupled system, it is essential that a symmetrical, bipolar read-write signal be employed, as the current integral of the bipolar read-write signal must be zero to ensure that no current-bias shift can accumulate on the selected transformer-coupled line due to repeated selections.

The primary object of the present invention thus is to provide a novel method of operating a magnetic memory element wherein one magnetic stable state is achieved through the employment of "amplitude-limited" switching and the other magnetic state is achieved through employment of "time-limited" switching while transformer-coupling a symmetrical read-write signal to the magnetic memory element drive line.

Another object of this invention is to provide a magnetic memory element that is switched from one stable magnetic state to another by a symmetrical bipolar field in the presence of a bias field.

Another object of this invention is to provide a magnetic memory system wherein the drive signals are transformer-coupled to the magnetic memory element drive line.

Another object of the invention is to provide a bistable memory element that provides an improved output signal ratio of signals representative of a stored "1" and "0" while permitting large write "0" signals.

Another object of this invention is to provide a word-organized magnetic memory system that achieves a high-speed read-write cycle through the use of "time-limited" switching and transformer-coupling of a symmetrical, bipolar read-write time-limited signal in combination with a bias field.

These and other more detailed and specific objects will be disclosed in the course of the following specification, reference being had to the accompanying drawings in which.

Figure 2:
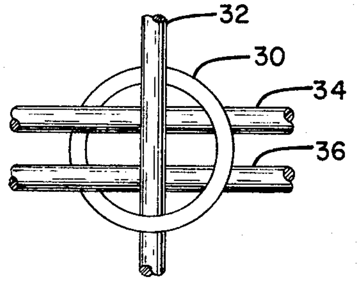
FIG. 2 illustrates a magnetic core and associated windings.
Figure 5:
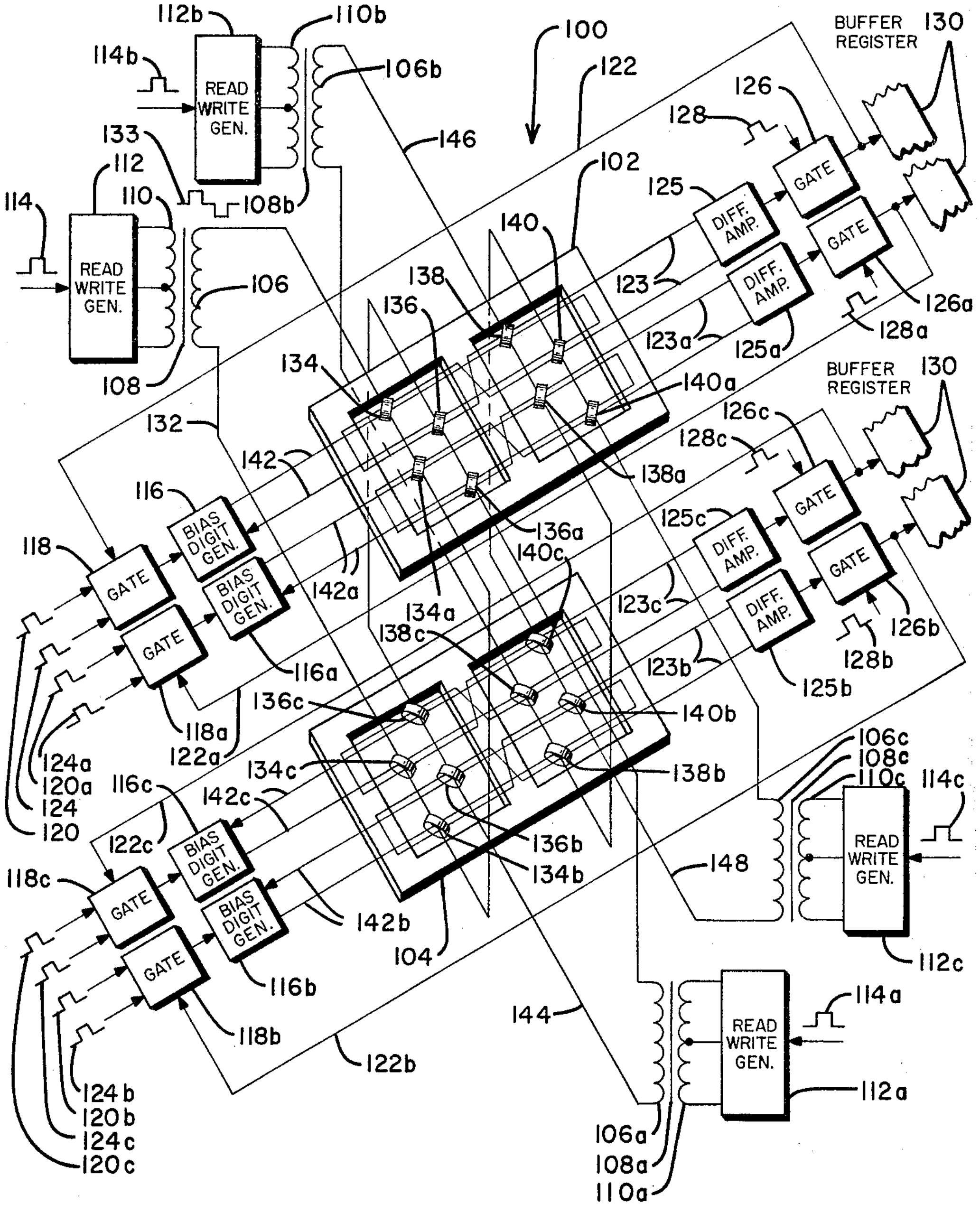
FIG. 5 illustrates an embodiment of this invention in a four-word word-organized memory system wherein each word is four bits in length.

This invention utilizes the concepts of time-limited and saturated or amplitude-limited switching techniques in combination with a symmetrical read-write signal utilizing transformer-coupling of the read-write signals to the magnetic memory element. Before a detailed discussion of the operation of the illustrated embodiment of FIG. 5 is given, review of the concepts of time-limited and amplitude-limited switching as employed with a core such as illustrated in FIG. 2 will be given. As stated in the above referred to copending application of Korkowski, V. J., conventional prior art magnetic memory systems utilize the concept of amplitude-limited switching. In this technique control drive fields drive the magnetic state of the core into two conditions: saturation or steady-state. In contrast, time-limited switching uses the technique wherein conrol drive fields drive the magnetic state of the core into a time-limited condition. The term "time-limited" when used in the specification shall mean that condition of the core wherein with a constant drive field amplitude, increase of the drive field duration will cause appreciable increase in core flux density.

Figure 1:
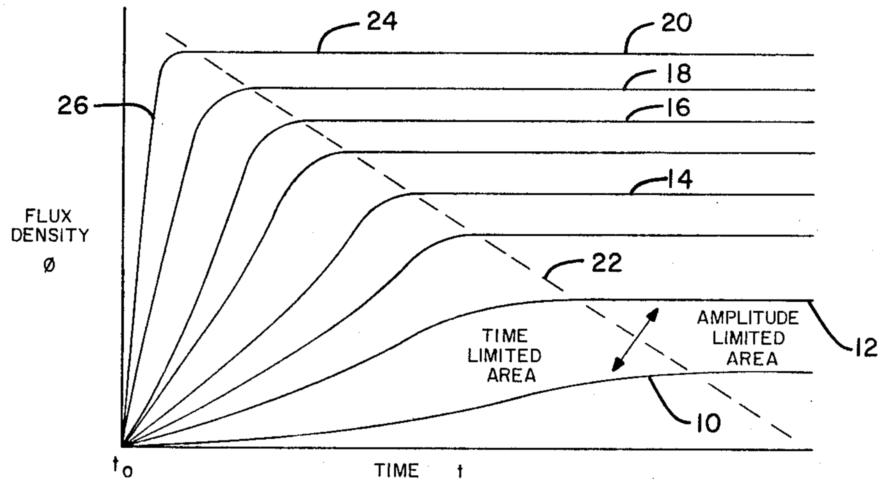
FIG. 1 illustrates a family of curves depicting the variation of magnetic flux density of a magnetic core as a function of the duration of the applied field for several constant applied field amplitudes.

FIG. 1 illustrates a family of curves depicting the variation of core flux density $\phi$ as a function of the duration $t$ of the applied field for several applied field amplitudes. With the drive field applied at time $t=0$, the knees of curves 10–20 or those portions of curves 10–20 which are to the right of dotted line 22 indicate core flux density when the core flux density has attained a stead-state condition corresponding to the amplitude of the applied drive field. It is apparent that increasing the drive field amplitude provides curves of increasing flux density for the same drive field duration. However, when a certain drive field amplitude is reached further increase of the drive field amplitude causes no appreciable increase in flux density. This condition is termed the "saturation" condition and is represented by the portion of curve 20 that is to the right of dotted line 22, or portion 24. The portion of curve 20 that is to the left of dotted line 22, or portion 26, represents operation in the time-limited condition. The three magnetic conditions and their definitions as discussed above may now be itemized as follows:

Steady-state—condition wherein with a constant drive field amplitude, increase of the drive field duration will cause no appreciable increase in core flux density.

Saturated—condition wherein increase of the drive field amplitude and duration will cause no appreciable increase in core flux density.

Time-limited—condition wherein with a constant drive field amplitude, increase of the drive field duration will cause appreciable increase in core flux density.

Note that both the saturated and steady-state conditions fall within the amplitude-limited class.

FIG. 2 illustrates a conventional, toroidal magnetic core 30 and the associated windings: word line 32, digit line 34 and sense line 36. This embodiment of a magnetic core is given for illustrative purposes only to aid in explanation of the operation of the memory system of FIG. 5 and no limitation to the particular size and shape depicted is intended. In the preferred embodiment of this invention as illustrated in FIG. 5, a bipolar, symmetrical read-write signal is applied to word line 32 producing a varying magnetic field that is inductively coupled to core 30. A unipolar bias signal is applied to digit line 34 concurrent with and of the same polarity as the read signal, and it produces a magnetic field that is inductively coupled to core 30 and which is additive to the field produced by the read signal. This combination of read-bias fields is of sufficient intensity to completely switch core 30 to an initial core condition that is defined as the "0" or negative (N) state. This initial core condition as utilized in the preferred embodiment of FIG. 5 is the saturated condition. If a "0" is to be written into the core, the bias signal is retained and is combined with the write signal of opposite polarity producing a magnetic field that is subtractive of the field produced by the bias signal and which combination of write-bias fields is of insufficient intensity to switch the core into the opposite "1" or positive (P) state. In the preferred embodiment of FIG. 5 upon cessation of the write-bias signal the bias signal is retained and the magnetic state of the core returns to a stable state established by the bias field. If a "1" is to be written into the core, the bias signal is removed and a unipolar digit signal is applied to digit line 34 concurrent with and of the same polarity as the write signal. The digit signal produces a magnetic field that is additive to the field produced by the write signal and which combination of write-digit fields is of sufficient intensity to switch the core into the "1" or positive (P) state which in the preferred embodiment of FIG. 5 is the time-limited condition.

It is to be understood that the preferred embodiment of this invention as described above is illustrative only and not to be constructed as a limitation thereof. Several methods of operation may be utilized to achieve a stated objective of this invention which objective is the utilization of a bias field with a symmetrical read-write signal. In the above described operation the bias signal is on substantially continually during memory system use. The bias signal is removed only during the write "1" cycle during which time a digit signal of the same polarity as the write signal replaces it. This digit signal is of sufficient amplitude such that the combined write-digit signals are only of sufficient amplitude to drive the core into a time-limited condition.

An alternate method to that above would be to operate the cores with coincident read-bias, write-bias and write-digit signals. In this embodiment the bias and digit signals would be pulses of substantially the same duration as the read and write signals with no bias signal being applied during the time the read and write signals are not on. In this embodiment the stable state of the core, except during the read and write cycles, would be under the influence of a zero external magnetic field wherein the "0" and "1" states would lie along zero axis 40 as at points 42 and 44 of FIG. 3, respectively.

Another embodiment would utilize a technique wherein a constant bias signal would be coupled to a bias line that would be parallel to the digit line and a digit signal would be coupled to the digit line. In this arrangement the amplitude of the digit signal would be equal to the sum of the amplitudes of the bias signal and the digit signal as utilized in the method discussed above. In this arrangement the stable state of the core, except during the read and write cycles would be at a magnetic state wherein the "0" and "1" states would lie along bias axis 46 as at points 48 and 50 of FIG. 3, respectively.

Figure 3:
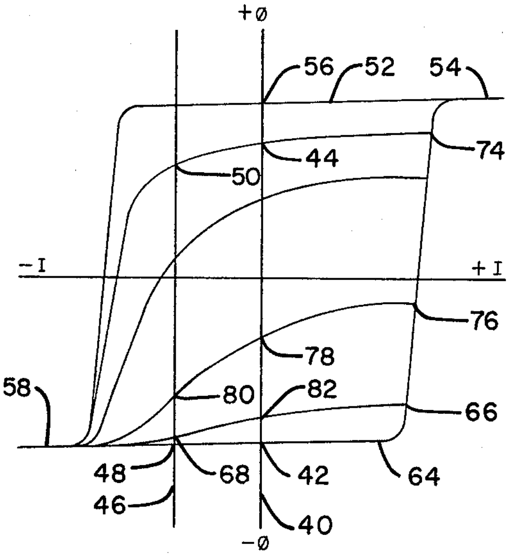
FIG. 3 illustrates the hysteresis characteristics of the core of FIG. 2.

FIG. 3 illustrates the hysteresis characteristics of core 30 and is presented to illustrate the magnetic state of core 30 when subjected to the drive fields produced by the drive signals coupled to word line 32 and digit line 34. The curves depicted in this figure are plots of the flux density $\phi$ in core 30 as a function of the drive field signal current in milliamperes flowing through lines 32 and 34. The outer loop 52, termed the major loop, indicates the flux density variation in core 30 when a drive current (such as represented by curve 20 of FIG. 1) of sufficient amplitude and duration to saturate core 30 flows through lines 32 and 34. Loop 52 (with a zero bias field) traces the magnetic state of core 30 when this saturating drive current is applied in a first, or positive, direction to drive core 30 from an initial "0" or negative (N) stable state denoted by point 42 into a state of positive saturation denoted by point 54 and when reversed, to drive the magnetic state of core 30 through the "1" or positive (P) stable remanent magnetic state denoted by point 56, into a state of negative saturation denoted by point 58, and then when removed to permit core 30 to attain a "0" or negative (N) stable magnetic state denoted by point 42.

A preferred embodiment of this invention as illustrated in FIG. 5 utilizes a bias field that shifts the magnetic stable axis of core 30 from zero axis 40 to bias axis 46. A symmetrical bipolar read-write signal combines with the digit signal and the bias signal to produce drive fields having the proper amplitude-duration characteristics so as to cause core 30 to operate in the "0" stable state saturated condition or the "1" stable state time-limited condition. In this embodiment drive signals conforming to wave forms *a* and *b* of FIG. 4 are utilized to provide an output signal conforming to wave form *c* of FIG. 4.

As discussed hereinbefore, this invention provides a magnetic memory system that utilizes a symmetrical, bipolar, read-write signal to permit the transformer-coupling of the read-write signal to the magnetic memory element. To be able to utilize a symmetrical, bipolar, read-write signal and yet provide the asymmetrical read-write fields wherein the read field is substantially more effective than the write field, a unipolar bias field is provide. This bias field is of the same polarity as the read field and it shifts the read-write field axis from zero axis 40 of FIG. 3 to bias axis 46. This biasing of the read-write fields provides a combined read-bias field of sufficient amplitude and duration to drive the magnetic state of core 30 from any arbitrary initial condition into saturation as represented by point 58 of FIG. 3 during the read cycle and to permit the magnetic state of core 30 to achieve a stable state represented by point 48 after cessation of the read cycle. This biasing of the read-write field also provides a combined write-bias field of insufficient amplitude and duration to drive the magnetic state of core 30 into the steady-state condition corresponding to the amplitude of the combined write-bias fields.

Figure 4:
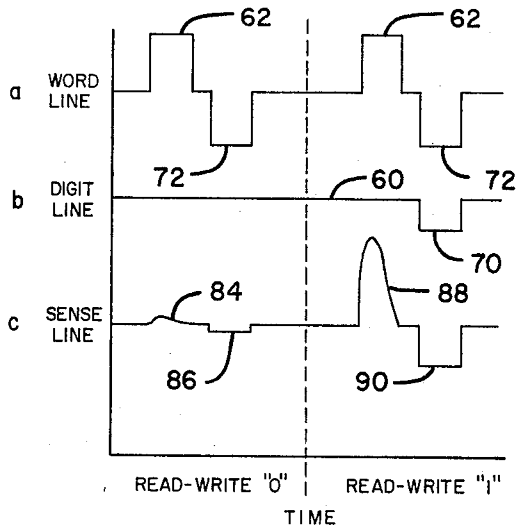
FIG. 4 illustrates the wave forms of the signals applied to and read-out of the windings of FIG. 2.

For the writing of a "0," the bias field drive signal—see pulse 60 of wave form *b* of FIG. 4—is coupled to digit line 34. The combined write-bias field drive signal—pulse 72 of wave form a plus pulse 60 of wave form *b* of FIG. 4—merely moves the magnetic state of core 30 from its magnetic state denoted by point 48 along the substantially horizontal portion of loop 52 to a point 64 which is short of its knee which, at the cessation of the write "0" cycle, returns substantially to the stable state denoted by point 48 which represents a stored "0." This variation of the magnetic state of of core 30 would be effected by the application of a write "0" drive field as represented by curve 10 of FIG. 1 and while operating in the time limited condition designated by that portion of curve 10 that is to the left of dotted line 22. An alternate embodiment in which the read-write signal is of a larger amplitude may drive the magnetic state of core 30 past the knee of loop 52 to point 66 which, at the cessation of the write "0" cycle, returns to a "disturbed 0" stable state denoted by point 68. This alternate embodiment may be utilized when a substantially larger amplitude read-bias field is required to ensure that the magnetic state of all the cores of a memory system matrix array such as illustrated in FIG. 5 are driven into saturation and reside at a common stable state denoted by point 48 at the cessation of the read cycle. This variation of the magnetic state of core 30 would be effected by the application of a write "0" drive field as represented by curve 12 of FIG. 1 and while operating in the time-limited condition designated by that portion of curve 12 which is to the left of dotted line 22.

For the writing of a "1," the bias field drive signal—pulse 60 of wave form *b* of FIG. 4—is removed from digit line 34 and is replaced by a digit field drive signal—pulse 70 of wave form *b* of FIG. 4. The combined write-digit field drive signal—pulse 70 of wave form *b* plus pulse 72 of wave form *a* of FIG. 4—moves the magnetic state of core 30 from its stable state denoted by point 48 along loop 52 to point 74 which is determined by the time-limited condition of the amplitude and duration of the write-digit field. Upon cessation of the write-digit field, the magnetic state of core 30 moves along curve 74–44–50 and resides at the stable state denoted by point 50 which represents a stored "1."

Initiation of the next read cycle, i.e., the duration of pulse 62 of wave form *a* of FIG. 4, presents a saturating read-bias field which drives all cores—whether in a previously stored "1" or "0" state—into negative saturation such as point 58 of loop 52. Sense line 36 of FIG. 2 is inductively coupled to core 30 so that any flux variation in core 30 caused by the saturating read-bias field produces an output or sense signal therein. Inspection of FIG. 3 indicates that the flux variation associated with a stored "1" as denoted by point 50 of FIG. 3 is substantially larger than that associated with a stored "0" as denoted by point 48 of FIG. 3. This substantial difference in the output signal of a stored "1" and a stored "0" is utilized by a utilization device that produces a two-level output signal that is directed through appropriate means which regenerates or writes a "1" or a "0" back into the particular magnetic memory element during the following write cycle, i.e., the duration of pulse 72 of wave form *a* of FIG. 4.

As stated herein, the writing of a "0" or "1" may utilize write drive field signals of various amplitudes and durations. The effect of increasing the amplitudes and durations of the write drive field signal is to drive the magnetic state of core 30 further along curve 52 toward the saturated condition denoted by point 54. The practical limitation to increasing the amplitude and duration of the write drive field signal for a write "0" condition is the establishment of a "0" stable state of a sufficient difference of core flux density from that of the "1" stable state so as to ensure an output signal of a stored "1" that is distinguishable from that of a stored "0." This ratio of "1" to "0" output signals is improved with the utilization of a bias field that establishes the stable states of core 30 along bias axis 46 rather than along zero axis 40.

Curve 48–42–64–66–76–78–80 of FIG. 3 represents the variation of the magnetic state of core 30 when subjected to a large amplitude write "0" drive field as represented by curve 14 of FIG. 1 and while operating in the time-limited condition designated by that portion of curve 14 that is to the left of dotted line 22. With a bias field present the stable state of core 30 resides at point 80 of FIG. 3 while if a zero bias field were present the stable state of core 30 would reside at point 78. Inspection of the total flux in core 30 as represented by points 80 and 78 as compared to the flux in core 30 as represented by points 48 and 42 indicates that a substantial difference in total flux in core 30 exists under the two stable state conditions. Using the lower horizontal portion of curve 52 as a base, the ratio of the total flux to be read-out of core 30 under the above two stable state conditions is approximately 2.28 to 1. Using curve 48–42–64–66–82–68 in a similar nature the ratio of the total flux to be read-out of core 30 under the corresponding magnetic stable states is approximately 4.12 to 1.

Thus, assuming that the output signal induced in sense line 36 is a function of the flux variation in core 30 the ratio of the read "1" to the read "0" output signals under the above two stable state conditions should be substantially improved with the utilization of a bias field.

In an embodiment in which there is no bias field present when the magnetic state of the core is returning to a stable state from point 76 after cessation of the write cycle the magnetic state of core 30 returns to point 78. However, in an embodiment in which there is a bias field present when the magnetic state of the core is returning to a stable state after cessation of the write cycle the magnetic state of core 30 returns to point 80. Thus, it is apparent that the presence of a bias field after cessation of the write cycle and while the magnetic state of the core is returning to a stable state causes the magnetic state of core 30 to be driven toward loop 52 which is the magnetic state achieved by a saturating drive field. The effect of the bias field is to depress the affect of a large write "0" drive field which drives the magnetic state of core 30 beyond point 64. This depression is the tendency of the bias field to cause the magnetic state of core 30 to follow the curve representing its magnetic state into a stable state of greater flux density. The bias field thus permits the utilization of a symmetrical, bipolar read-write signal of greater amplitude than that which may be utilized without a bias field while providing distinguishable read "0" and read "1" outputs on sense line 36.

FIG. 4 illustrates the wave forms of the drive signals coupled to word line 32 and digit line 34 and of the output signals induced in sense line 36 of the preferred embodiment of FIG. 5. The read-write signal of wave form *a* is a symmetrical, bipolar signal comprised of read pulse 62 and write pulse 72. The bias-digit signal of wave form *b* is an asymmetrical bipolar signal comprised of bias pulse 60 and digit pulse 70. As explained above, the amplitude-duration characteristics of the combinations of the read-write and bias-digit signals cause the "0" and "1" outputs of wave form *c*.

The utilization of a bias field causes reduced output signals during the read cycle. However, as the reduction in output signals due to the bias field is of a substantial effect for a read "0" as compared to a read "1" the result is a substantially improved ratio of a read "1" to a read "0" output signal. This improved output signal ratio is exemplified by comparison of pulse 84 for a read "0" to pulse 88 for a read "1."

With conventional operation of a magnetic memory element in the present of a zero bias field the time integral of the sense line read pulse equals that of the sense line write pulse. This is due to the fact that the excursion of the core magnetic state under a zero bias field is equal for the read and write cycles. Using curve 48–42–64–66–76–78–80–58–48 as an example, the core magnetic state under a zero bias field write "0" condition would move from magnetic stable state 42 to magnetic stable state 78. On read-out the core magnetic state would move from magnetic stable state 78 back to magnetic stable state 42. Normally, under a bias field represented by bias line 46 the core magnetic state would move from magnetic stable state 48 to magnetic stable state 80 and on read-out from magnetic stable state 80 back to magnetic stable state 48. However, as the core magnetic state under a bias field must traverse a greater distance than when under a zero bias field the duration of the write pulse drives the core magnetic state onto curve 76–78–80, but the duration of such pulse is such that the core magnetic state does not reach point 80 during the write cycle. During the time interval between the cessation of the write cycle and the beginning of the next read cycle the bias field drives the core magnetic state along curve 76–78–80 to reside at stable state 80. Thus, the core flux density variation which occurs between the cessation of the write cycle and the beginning of the next read cycle is lost as regards read cycle output. As the ratio of "lost flux" to "stored flux" for a stored "0" is substantially larger than that for a stored "1" the ratio of the area enclosed by pulse 84 to that enclosed by pulse 86 is substantially smaller than the ratio of the area enclosed by pulse 88 to that enclosed by pulse 90. This relationship assures distinguishable "0" and "1" outputs on sense line 36.

A preferred embodiment of this invention as illustrated in FIG. 5 utilizes signals of certain specified characteristics whose relationships may be summarized as follows:

$$I_{\text{read-bias}} = I_{\text{read}} + I_{\text{bias}}$$
$$I_{\text{write-bias}} = I_{\text{write}} - I_{\text{bias}}$$
$$I_{\text{write-digit}} = I_{\text{write}} + I_{\text{digit}}$$
$$|I_{\text{bias}}| > |I_{\text{digit}}|$$
$$I_{\text{read}} = -I_{\text{write}}$$
$$T_{\text{read}} = T_{\text{write}}$$
$$T_{\text{read-bias}} = T_{\text{write-digit}}$$
$$T_{\text{read-bias}} = T_{\text{write-bias}}$$

By utilizing read and write signals of equal duration (T) and absolute magnitude ($|I|$) but of opposite polarity the time integral of the read and write signals are of equal and opposite magnitude or $$\int_{\text{read}} dt = -\int I_{\text{write}} dt$$

This relationship ensures that no current saturation drift will occur in a transformer means that couples the read-write signal to the magnetic memory element by way of word line 32. Further, as the read-bias field is of a greater absolute magnitude than both the write-bias and write-digit fields, or $$|I_{\text{read-bias}}|>|I_{\text{write-bias}}|$$
$$|I_{\text{read-bias}}|>|I_{\text{write-digit}}|$$

and as the durations of the read-bias, write-bias and write-digit drive fields are equal, the requirement that the time integral of the read-bias signal is greater than the time integral of the write-bias and write-digit signals is met or $$\int I_{\text{read-bias}}dt>\int I_{\text{write-bias}}dt$$
$$\int I_{\text{read-bias}}dt>\int I_{\text{write-digit}}dt$$

This relationship ensures that the read cycle presents a drive field of sufficient amplitude and duration to drive all cores—whether in a previously stored "1" or "0" state—into negative saturation such as denoted by point 58 in FIG. 3. This also ensures that all cores after cessation of the read cycle and prior to initiation of the write cycle are driven into a common magnetic state denoted by point 48 of FIG. 3. The utilization of an initial magnetic state that is common to all the cores of the magnetic memory matrix array ensures uniform operating characteristics of all the cores with resulting uniform output signals. This uniformity of output signals that are indicative of a stored "1" or a stored "0" provides a highly reliable memory system.

FIG. 5 illustrates a preferred embodiment of the invention in which the magnetic memory element disclosed hereinbefore is incorporated in a four-word, word-organized magnetic memory system wherein each word is four bits in lengths. This memory system provides destructive read-out of the stored data on the read cycle with regeneration, or a writing back in, during the write cycle of the read-out data.

To more fully describe the operation of the memory system of FIG. 5 certain accessory control and utilization equipment is included which may be considered ancillary to the illustrated embodiment of the magnetic memory elements into memory system 100. Memory system 100 is composed of two substantially similar two-dimensional arrays, 102 and 104, with each array comprised of eight magnetic memory elements, or cores. The cores of each array are arranged in four columns of four rows with a core at altenate intersections of the columns and rows. A separate word line is coupled to all the cores of each column and a separate digit line is coupled to all the cores of each row with adjoining pairs of digit lines intercoupled at the right hand edge of the arrays to form pairs of rows and a return circuit through the intercoupled digit line of the other row of the pair of rows. Two sense lines are coupled to all the cores of each pair of rows with a first sense line coupling separate halves of the cores of each row of said pair of rows in a first and second magnetic sense with a second sense line coupling separate halves of the cores of each row of said pair of rows in a first and second magnetic sense. The two sense lines which are coupled to the cores of the pair of rows are intercoupled at the left hand edge of the array to form a return circuit through the intercoupled sense line.

Array 104 is a mirror image of array 102 with corresponding word lines of arrays 102 and 104 alternately intercoupled on the front and rear edges of arrays 102 and 104 such that the intercoupled word lines of each array form a four-bit word by serially coupling two cores of each array. The non-intercoupled ends of each of the intercoupled pairs of word lines are coupled to terminals of output coil 106 of transformer 108 the input coil 110 of which is coupled to read-write generator 112 which is strobed or gated by read-write timing pulse 114. Each pair of rows has the non-intercoupled ends of the intercoupled digit lines coupled to a bias-digit generator 116 which is strobed by the output of a digit timing gate 118.

Digit timing gate 118 is strobed by digit timing pulse 120 which if concurrent with the imposition of a write "1" signal from regeneration line 122 or by memory write pulse 124 produces an output which strobes bias-digit generator 116. Digit timing gate 118 output causes bias-digit generator 116 to remove bias signal 60 from digit line 34 during the write cycle and causes it to be replaced by digit signal 70—see wave form *b* of FIG. 4. Thus:

(a) If a memory write pulse 124 representative of a "1" and a digit timing pulse 120 are concurrently impressed upon digit timing gate 118 a "1" will be written into the particular core selected, or (b) If a signal representative of a "1" is impressed upon digit timing gate 118 by regeneration line 122 concurrent with the imposition of a digit timing pulse 120 a "1" will be written back into the particular core sensed.

Under all other conditions a "0" will be written into the selected core during the write cycle.

Pair of rows 123 has the ends of the intercoupled sense lines coupled to a differential amplifier 125 whose output is fed through sense line output gate 126 which upon imposition of strobe pulse 128 transmits the sense line output to buffer register 130 and digit timing gate 118. During the memory system write cycle the sense line output is regenerated, or written back into the cores, through regeneration line 122 to digit timing gate 118, into bias-digit generator 116, and then coupled to the selected core through the digit lines. Each pair of rows of arrays 102 and 104 has circuitry similar to that of pair of rows 123 as discussed above.

The sense line outputs of each pair of rows presents digital data to buffer register 130 which is representative of the word stored in the cores of the selected word line. Thus, if the word stored in the cores associated with word line 132 is desired, a read-write timing pulse 114 is impressed upon read-write generator 112 which impresses read-write signal 133 (see wave form *a* of FIG. 4) on transformer 108 which couples such signal to word line 132. During the read cycle read pulse 62 of wave form *a* combines with bias pulse 60 of wave form *b* of FIG. 4 to switch all the associated cores to the negative saturation condition such as point 58 of FIG. 3. The output of the cores is sensed by the associated pairs of sense lines 123, **123*a*, 123*b* and 123*c* which feed differential amplifiers 125, 125*a*, 125*b* and 125*c*, respectively. These differential amplifier outputs are directed through gating means 126, 126*a*, 126*b* and 126*c* to buffer register 130 and to digit timing gates 118, 118*a*, 118*b* and 118*c* which regenerate or write a "1" or a "0" back into the particular magnetic memory elements 134, 134*a*, 134*b* and 134*c* which are associated with word line 132 through generators 116, 116*a*, 116*b* and 116*c***, respectively, during the following write cycle.

The arrangement of the sense line and the cores of each pair of rows whereby a common sense line is coupled to all the cores of a pair of rows is such as to produce opposing magnetic fields in each pair of opposing cores—such as cores 138 and core 140—which opposing magnetic fields cancel out any noise signal generated in pair of lines 123 due to variations in core magnetic states caused by the action of a bias-digit signal flowing through pair of lines 142 in cores of unselected word lines 144, 146 and 148. This noise canceling action of the core-sense line arrangement of arrays 102 and 104 ensures a more reliably operating magnetic memory system by improvement of the signal-to-noise ratio of the sense line output.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A magnetic memory system comprising a plurality of substantially similar two-dimensional arrays each of which includes a plurality of magnetic cores each having a substantially rectangular hysteresis characteristic and being capable of being operated in a time-limited, a steady-state, or a saturated condition as a function of a magnetic field of a predetermined amplitude-duration characteristic, with all of said cores arranged in columns and rows and including a first plurality of conductors each of which is inductively coupled to a separate column and a second plurality of conductors each of which is inductively coupled to a separate row for producing a plurality of magnetic fields for placing said cores in at least two magnetic stable states and a third plurality of conductors each of which is inductively coupled to predetermined ones of said cores for sensing the magnetic state of said cores, the improvement comprising: means coupled to each of said first plurality of column conductors for conducting symmetrical first and a second, opposite polarity, time-limited, read and write signals, respectively; means coupled to each of said second plurality of row conductors for conducting a constant bias signal of said first polarity and a time-limited digit signal of said second polarity wherein the field produced by said read and bias signals has a sufficient amplitude-duration characteristic to drive the magnetic state of said cores into a first stable state saturation condition, the field produced by said write and bias signals has an insufficient amplitude-duration characteristic to drive the magnetic state of said cores into a stable state substantially different from said first stable state, and the field produced by said write, bias and digit signals has only a sufficient amplitude-duration characteristic to drive the magnetic state of said cores into a second stable state time-limited condition; and transformer means coupling said read-write signals to said first plurality of column conductors.

2. The apparatus of claim 1 wherein the conductors of said second plurality of conductors of two adjoining rows are inter-coupled for forming separate pairs of rows of cores with at least one conductor of said third plurality of conductors coupling all the cores of each pair of rows of cores with said one conductor coupling a first half of said cores in a first magnetic sense and a second half of said cores in a second and opposite magnetic sense.

3. A magnetic memory system comprising a plurality of substantially similar two-dimensional arrays each of which includes a plurality of magnetic cores having a substantially rectangular hysteresis characteristic and being capable of being operated in a time-limited, a steady-state, or a saturated condition as a function of a magnetic field of a predetermined amplitude-duration characteristic; with all of said cores arranged in Y columns of X rows with one of said cores at alternate intersections of said columns and rows with each of said columns forming a word of $X/2$ bits and including a first plurality of conductors each of which is inductively coupled to a separate column and a second plurality of conductors each of which is inductively coupled to a separate row for producing a plurality of magnetic fields for placing said cores in at least two magnetic stable states, a third plurality of separate conductors each of which is inductively coupled to predetermined ones of said cores for sensing the magnetic state of said cores, the improvement comprising: means coupled to each of said first plurality of column conductors conducting similar first and second, opposite polarity, time-limited, read and write pulse signals; means coupled to each of said second plurality of row conductors for mutually exclusively conducting a bias signal of said first polarity and a digit signal of said second polarity wherein the field produced by said read and bias signals has a sufficient amplitude-duration characteristic to drive the magnetic state of said cores into a first stable state saturation condition, the field produced by said write and bias signals has only a sufficient amplitude-duration characteristic to drive the magnetic state of said cores into a time-limited second stable state, and the field produced by said write and digit signals has only a sufficient amplitude-duration characteristic to drive the magnetic state of said cores into a different time-limited third stable state; and transformer means coupling said read-write signals to said first plurality of column conductors.

4. The apparatus of claim 3 wherein conductors of said second plurality of row conductors of two adjoining rows are inter-coupled to form pairs of rows with at least one conductor of said third plurality of conductors coupling all the cores of each pair of rows with said one conductor coupling a first half of said cores in a first magnetic sense and a second half of said cores in a second and opposite magnetic sense.

5. A magnetic memory system wherein a plurality of substantially similar two-dimensional arrays of magnetic cores having substantially rectangular hystersis characteristics all arranged in rows and columns and having driving means which are inductively coupled to said cores for producing a plurality of magnetic fields for placing said cores in at least two magnetic stable states and having sensing means which are inductively coupled to said cores for sensing the magnetic state of said cores, the improvement comprising: first driving means inductively coupled to said cores for conducting a first signal of a first polarity and a second signal of a second and opposite polarity; said first and second signals being of equal amplitude and duration; second driving means inductively coupled to said cores for conducting a third signal of said first polarity; third driving means inductively coupled to said cores for conducting a fourth signal of said second polarity; each of said first and second signals individually being of insufficient duration to cause the flux in said cores to reach the steady-state condition corresponding to the amplitude of each of said signals; said first and third signals cumulatively of sufficient amplitude and duration for causing the flux in said cores to reach a substantially saturated first stable state; said second and fourth signals cumulatively being of insufficient duration to cause the flux in said cores to reach the steady-state condition corresponding to the amplitude of said cumulative signals for causing the flux in said cores to reach a time-limited second stable state; the improvement permitting said first and second signals to be transformer-coupled to said cores.

6. The apparatus of claim 5 wherein at least one of said second driving means couples all the cores of two adjoining rows for forming separate pairs of rows of cores with at least one of said sensing means coupling all the cores of each pair of rows of cores with said one sensing means coupling a first half of said cores in a first magnetic sense and a second half of said cores in a second and opposite magnetic sense.

7. A magnetic memory element comprising: at least one magnetic core having a substantially rectangular hysteresis characteristic and being capable of being operated in a time-limited, a steady-state, or a saturated condition as a function of a magnetic field of a predetermined amplitude-duration characteristic; at least first and second conductors each of which is inductively coupled to said core for producing a plurality of magnetic fields for placing said core in at least two magnetic stable states, a third conductor which is inductively coupled to said core for sensing the magnetic state of said core, the improvement comprising: means coupled to said first conductor for conducting symmetrical time-limited read-write signals wherein said read signal is of a first polarity and said write signal is of a second polarity; means coupled to said second conductor for conducting a bias signal of said first polarity and a digit signal of said second polarity wherein the field produced by said read and bias signals has a sufficient amplitude-duration characteristic to drive the magnetic state of said cores into an initial first stable state saturation condition; the field produced by said write and bias signals has only a sufficient amplitude-duration characteristic to drive the magnetic state of said cores into a time-limited condition and is insufficient to cause the magnetic state of said core to achieve a stable state substantially different from said initial first stable state saturated condition; the field produced by said write and digit signals is only of a sufficient amplitude-duration characteristic to drive the magnetic state of said cores into a second stable state time-limited condition; and transformer means coupling said read-write signal to said first conductor.

8. A magnetic memory element comprising: at least one magnetic core having a substantially rectangular hysteresis characteristic and being capable of being operated in a time-limited, a steady-state, or a saturated condition as a function of a magnetic field of a predetermined amplitude-duration characteristic; a plurality of means inductively coupling at least first, second, third and fourth signals to said core for producing at least first, second, third and fourth magnetic fields respectively, for placing said core in at least first and second magnetic stable states; said first and third signals being symmetrical first and second polarity, time-limited, pulses, respectively, and being mutually exclusive in time; said second and fourth signals being of said first and second polarity, respectively, and being mutually exclusive in time; said first field having a predetermined amplitude-duration characteristic for combining with said second field for placing the magnetic state of said core in a saturated first stable state; said third field having a predetermined amplitude-duration characteristic for combining with said second field for causing the flux in said core to reach a steady-state condition and which is insufficient to drive the magnetic state of said core into the area of high permeability and into a substantially different stable state from said first stable state; said fourth field having a predetermined amplitude-duration chracteristic for combining with said third field for causing the flux in said core to reach a steady-state condition and which is sufficient to place said core in a time limited second stable state.

9. The apparatus of claim 8 further including a transformer means for coupling said first and third signals to said core.

10. A magnetic memory element comprising: at least one magnetic core having a substantially rectangular hysteresis characteristic and being capable of being operated in a time-limited, a steady-state, or a saturated condition as a function of a magnetic field of a predetermined amplitude-duration characteristic; a plurality of means inductively coupling at least first, second, third and fourth signals to said core for producing at least first, second, third and fourth magnetic fields respectively, for placing said core in at least first, second and third magnetic stable states; said first and third signals being symmetrical first and second polarity, time-limited pulses, respectively; and being mutually exclusive in time; said second and fourth signals being of said first and second polarity, respectively; said first field having a predetermined amplitude-duration characteristic for combining with said second field for placing the magnetic state of said core in a saturated first stable state; said third field having a predetermined amplitude-duration characteristic for combining with said second field for placing the magnetic state of said core in a time-limited second stable state; said fourth field having a predetermined amplitude-duration characteristic for combining with said second and third fields for placing the magnetic state of said core in a different, time-limited, third stable state.

11. The apparatus of claim 10 further including a transformer means for coupling said first and third signals to said core.

12. A magnetic memory element comprising: at least one magnetic core having a substantially rectangular hysteresis characteristic and being capable of being operated in a time-limited, a steady-state, or a saturated condition as a function of a magnetic field of a predetermined amplitude-duration characteristic; a plurality of means inductively coupling at least first, second, third and fourth signals to said core for producing at least first, second, third and fourth magnetic fields respectively, for placing said core in at least first and second magnetic stable states; said first and third fields being symmetrical, first and second polarity, time-limited pulses, respectively, and being mutually exclusive in time; said first field having a predetermined amplitude-duration characteristic for combining with said second field for placing the magnetic state of said core in a saturated first stable state; said third field having a predetermined amplitude-duration characteristic for combining with said second field, said combination being insufficient to drive the magnetic state of said core into the area of high permeability; said fourth field having a predetermined amplitude-duration characteristic for combining with said second and third fields for placing the magnetic state of said core in a time-limited second stable state.

13. The apparatus of claim 12 further including a transformer means for coupling said first and third signals to said core.

References Cited by the Examiner

UNITED STATES PATENTS

| | | | |
|---|---|---|---|
| 2,856,596 | 10/1958 | Miller | 340—174 |
| 2,862,198 | 11/1958 | Stuart-Williams | 340—174 |
| 2,931,017 | 3/1960 | Bonn | 340—174 |
| 3,027,547 | 3/1962 | Froehlich | 340—174 |
| 3,196,413 | 7/1965 | Teig | 340—174 |

FOREIGN PATENTS

| | | |
|---|---|---|
| 839,950 | 6/1960 | Great Britain. |
| 889,977 | 2/1962 | Great Britain. |

OTHER REFERENCES

IBM Technical Disclosure Bulletin, High Speed Core Memory, vol. 2, No. 2, August 1959, pp. 37 and 38.

Proceedings of the I.R.E., November 1957, pp. 1484–1492.

References Cited by the Applicant

IBM Technical Disclosure Bulletin, vol. 4, No. 11, April 1962, p. 57.

German printed application 1,185,659, Jan. 21, 1965.

BERNARD KONICK, *Primary Examiner.*

IRVING SRAGOW, *Examiner.*

M. S. GITTES, R. J. McCLOSKEY, *Assistant Examiners.*